UNITED STATES PATENT OFFICE.

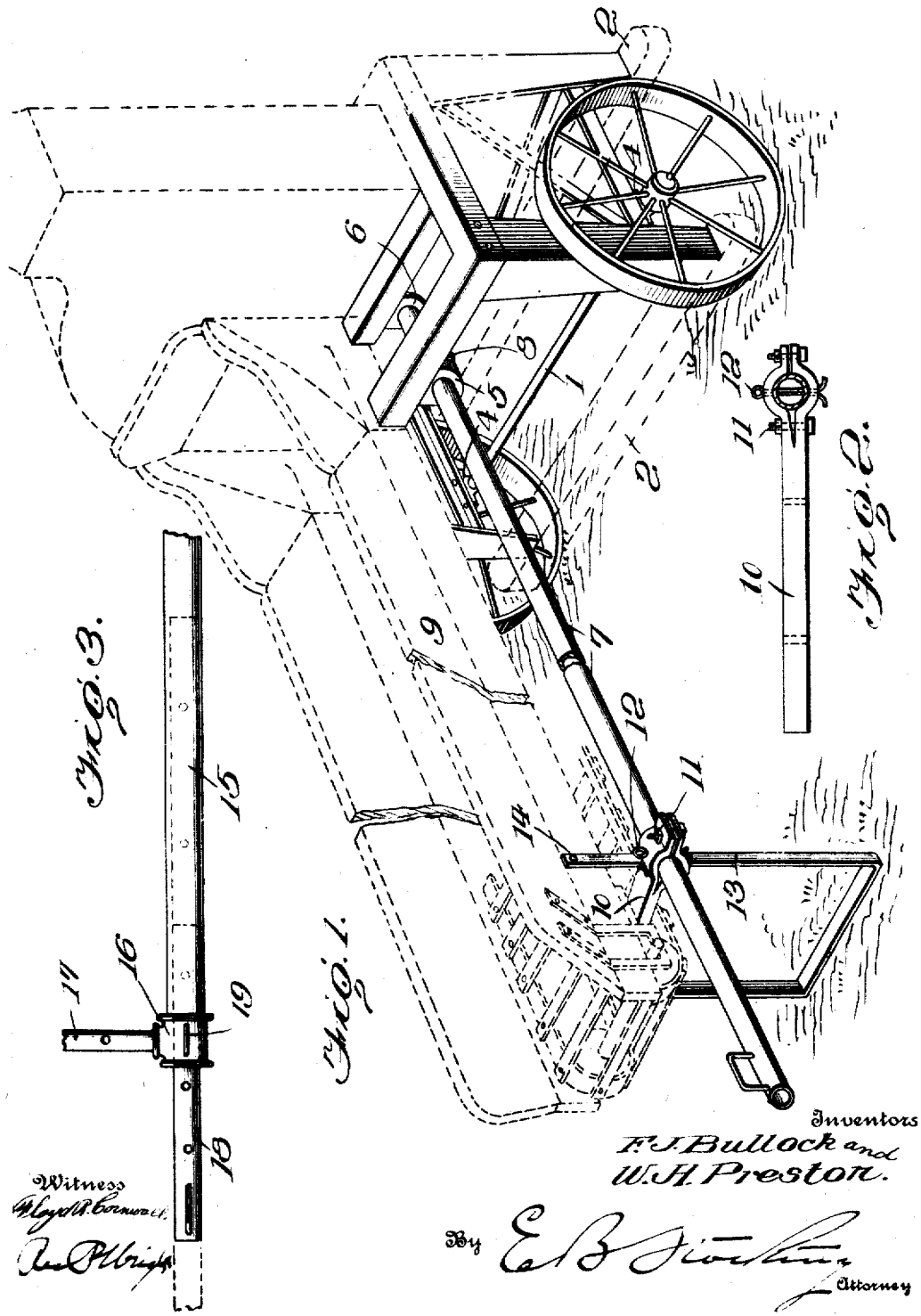

FRED J. BULLOCK AND WARD H. PRESTON, OF SHORTSVILLE, NEW YORK, ASSIGNORS TO PAPEC MACHINE COMPANY, OF SHORTSVILLE, NEW YORK, A CORPORATION OF NEW YORK.

ENSILAGE-CUTTER.

1,347,493.   Specification of Letters Patent.   Patented July 27, 1920.

Application filed November 6, 1916. Serial No. 129,799.

*To all whom it may concern:*

Be it known that we, FRED J. BULLOCK and WARD H. PRESTON, citizens of the United States, residing at Shortsville, in the county of Ontario and State of New York, have invented certain new and useful Improvements in Ensilage-Cutters, of which the following is a specification, reference being had therein to the accompanying drawing.

This invention relates to certain new and useful improvements in ensilage cutters, and more particularly to the frame construction therefor, the object being to provide a two-wheeled frame having a detachable draft bar in order to allow the same to be readily attached to a wagon or other conveyance for moving the cutter from place to place.

Another object of our invention is to provide a draft bar which can be extended in order to allow the same to be connected to a wagon, the extensible portion thereof being capable of being moved into such a position that a vehicle can readily pass the end of the conveyer in order to discharge its load into the same in feeding the material to the conveyer of the cutter.

Another object of our invention is to provide a frame construction in which the conveyer is supported by pivotally mounted legs when the cutter is being used, said leg being capable of being folded so as to be out of the way when the cutter is being hauled from place to place.

Another object of my invention is to provide the draft bar with an arm for connecting the same to the conveyer in such a manner that the bar will be held parallel to the conveyer.

Other and further objects and advantages of the invention will be hereinafter set forth and the novel features thereof defined by the appended claims.

In the drawings,

Figure 1 is a perspective view of an ensilage cutter showing our improved construction of frame in full lines;

Fig. 2 is a detail view of the supporting arm showing the draft bar in section in position therein; and Fig. 3 is a detail plan view of a slightly modified form of draft bar.

Like numerals of reference refer to like parts in the several figures of the drawings.

In carrying out our invention we employ a wheeled axle 1 on which is mounted a frame 2 for supporting the cutting mechanism not shown, which is inclosed in a casing as shown in dotted lines. The construction of frame as herein shown comprises base pieces provided with standards having a supplemental frame mounted on the top thereof, said standards being connected together by brace rods 3, which are provided with bearings 4, in which the axle 1 is mounted as clearly shown.

The supplemental frame carried by the standards is preferably formed of angle iron, as clearly shown in Fig. 1, and is provided with a supporting sleeve 5 and a socket 6, in which is arranged a tubular reach 7, the end of the reach fitting within the socket 6 as shown in Fig. 1. The reach is provided with a transverse bore adapted to register with a transverse bore formed in the supporting sleeve 5 and through which passes a bolt 8 for securely fastening the reach to the frame. The reach extends parallel with the conveyer 9 of the cutter and carries an arm 10 which is connected to the conveyer by bolts, not shown, the end of the arm being enlarged and split forming the sleeve to receive the reach 7 which is clamped around the reach by bolts 11, the reach being secured within the sleeve by a cotter pin 12 passing transversely through the sleeve and reach, as clearly shown in Fig. 2.

The particular manner of connecting the extending arm of the reach to the conveyer is not essential, in carrying out our invention, as the main object to be accomplished is to provide a two-wheeled truck for ensilage cutters in which the frame for supporting the mechanism is provided with a reach having a laterally extending arm for supporting the end of the conveyer when the cutter is being moved.

In order to provide means for supporting the free end of the conveyer when the ensilage cutter is in operation, we provide a substantially U-shaped leg frame 13 which is pivotally connected at 14 to the conveyer, in order to allow the same to be swung upwardly under the conveyer when the reach is connected to a wagon for hauling the cutter from one field to another.

In the modified form shown in Fig. 3, the end of the reach 15 is provided with a T coupling 16 having a tubular arm 17 connected thereto which is connected to the conveyer substantially in the same manner as shown in the preferred form. Slidably mounted within the reach 15 is an extensible draft bar 18 having a series of vertically disposed openings formed therein adapted to register with the openings formed in the T coupling 16 and through which a cotter pin 19 is adapted to extend for holding the extensible draft bar 18 in adjusted position.

In the preferred form as shown in Fig. 1, the extensible draft bar is not shown, but it is of course understood that an extensible draft bar could be readily placed within the tubular reach 7 and locked in adjusted position by the cotter pin 12 and we do not wish to limit ourselves to the use of a draft bar in connection with the reach as by forming the reach of a sufficient length the same can be readily connected to a wagon or a vehicle of any kind, but we have found that in some cases it is of advantage to have an extensible draft bar which allows the same to be forced inwardly out of the way of a wagon in discharging its load into the conveyer. By providing the extensible draft bar it is not necessary to detach the reach from the conveyer when the cutter is being operated.

From the foregoing description it will be seen that we have provided an ensilage cutter mounted on a two-wheeled truck, the wheels of which are detached from the axle when the cutter is in operation in order to allow the frame to rest on the ground, so as to form a rigid support in order to eliminate the vibration caused by the machine when in operation.

When the wheels have been detached from the cutter, the leg frame 13 is forced into position to support the conveyer and the reach is removed so that the conveyer can be fed from the wagon.

In the drawings I have shown the cutter with the reach attached and the leg frame swung down into position to support the conveyer but it is of course understood that when the machine is in this position the leg frame will be swung upwardly under the conveyer so as to allow the reach to be attached to a vehicle for hauling the cutter.

We claim:

1. In an ensilage cutter, a two-wheeled frame, a conveyer carried by said frame and extending outwardly therefrom, a reach detachably connected to said frame at one end; an arm secured to said reach having a connection with the free end of said conveyer, a draft bar slidably carried by said reach, and means for locking said draft bar in adjusted position.

2. In an ensilage cutter, the combination with a frame, of a wheeled axle for supporting said frame, a conveyer supported by said frame and extending outwardly to one side thereof, a tubular reach carried by said frame, an arm carried by said reach for supporting the free end of said conveyer, and a leg frame pivotally connected to said conveyer.

3. In an ensilage cutter, the combination with a two-wheeled frame for supporting the same, of a conveyer extending outwardly from said cutter, a reach extending parallel with said conveyer, an arm carried by said reach for supporting the free end of said conveyer, and an extensible draft bar carried by said reach.

4. In an ensilage cutter, the combination with a two-wheeled frame and the conveyer thereof, of a reach detachably connected to said frame, an arm having a split sleeve clamped around the free end of said reach, said arm extending laterally under said conveyer for supporting the free end thereof.

In testimony whereof we hereunto affix our signatures in the presence of two witnesses.

FRED J. BULLOCK.
WARD H. PRESTON.

Witnesses:
F. A. WARNER,
W. C. ELLIS.